US008538809B2

(12) United States Patent
Kantak et al.

(10) Patent No.: US 8,538,809 B2
(45) Date of Patent: Sep. 17, 2013

(54) ESTIMATING ON-LINE ADVERTISING INVENTORY VALUE BASED ON CONTRACT ELIGIBILITY INFORMATION (75) Inventors: Darshan V. Kantak, Pasadena, CA (US); Sai-Ming Li, Santa Clara, CA (US); Michael A. Schwarz, Berkeley, CA (US); R. Preston McAfee, San Marino, CA (US); Jack Z. Xie, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1135 days.

(21) Appl. No.: 12/240,826

(22) Filed: Sep. 29, 2008

(65) Prior Publication Data
US 2010/0082503 A1    Apr. 1, 2010

(51) Int. Cl.
*G06Q 30/00*    (2012.01)
(52) U.S. Cl.
USPC ........................... 705/14.4; 705/14.73
(58) Field of Classification Search
USPC .......... 705/14.41, 14.61, 14.68, 14.69, 14.71, 705/14.73, 35
See application file for complete search history.

(56) References Cited

U.S. PATENT DOCUMENTS

| | | | | |
|---|---|---|---|---|
| 7,349,876 | B1 * | 3/2008 | Veach ............................... | 705/35 |
| 2002/0010630 | A1 * | 1/2002 | Kitamura ........................ | 705/14 |
| 2002/0133399 | A1 * | 9/2002 | Main ................................ | 705/14 |
| 2003/0171990 | A1 * | 9/2003 | Rao et al. ........................ | 705/14 |
| 2004/0122735 | A1 * | 6/2004 | Meshkin ......................... | 705/14 |
| 2004/0225562 | A1 * | 11/2004 | Turner ............................. | 705/14 |
| 2005/0050215 | A1 | 3/2005 | Lin et al. | |
| 2005/0149396 | A1 * | 7/2005 | Horowitz et al. ............... | 705/14 |
| 2007/0027770 | A1 | 2/2007 | Collins et al. | |
| 2007/0027771 | A1 | 2/2007 | Collins et al. | |
| 2007/0271136 | A1 * | 11/2007 | Strauss et al. .................. | 705/14 |
| 2008/0033810 | A1 | 2/2008 | Chu | |
| 2008/0154784 | A1 | 6/2008 | Veeraraghavan | |
| 2008/0154797 | A1 | 6/2008 | Choul won | |
| 2009/0150224 | A1 * | 6/2009 | Lu et al. ......................... | 705/10 |
| 2011/0191190 | A1 * | 8/2011 | Heller et al. ............... | 705/14.68 |

OTHER PUBLICATIONS

The rise of performance-based advertising, iMedia Connection, Brandt Dainow, Mar. 26, 2008.*

* cited by examiner

*Primary Examiner* — Matthew T Sittner
(74) *Attorney, Agent, or Firm* — Weaver Austin Villeneuve & Sampson LLP (57) ABSTRACT

Disclosed are apparatus and methods for apparatus and methods for pricing on-line advertisement inventory. In one embodiment, a method for pricing on-line advertisement inventory includes (i) receiving a request for a price of a new product, wherein the new product includes a plurality of specified characteristics of a type of on-line advertisement display, (ii) providing a sample of new impressions that are predicted to be delivered for such new product, (iii) for each new impression, determining which bookings could be served by such new impression so as to define a set of overlapping bookings, (iv) determining the price of each new impression based on a weighted average of a plurality of prices of such each new impression's corresponding overlapping bookings, (v) determining the price of the new product based on an average of the prices of the new impressions, and (vi) returning the price of the new product for use in a booking negotiation with a potential buyer of such new product.

21 Claims, 4 Drawing Sheets

ESTIMATING ON-LINE ADVERTISING INVENTORY VALUE BASED ON CONTRACT ELIGIBILITY INFORMATION

BACKGROUND OF THE INVENTION

The present invention is related to on-line advertising. It especially pertains to techniques and mechanisms for pricing on-line advertisement inventory.

For many web portals and Internet Service Providers (ISPs), advertising is a major source of revenue. One form of advertising involves showing advertisers' advertisement banners on web sites that are being visited by users. For example, a preeminent portal such as Yahoo! displays advertisers' advertisements on one or more associated web sites that are viewed by users. In return, the advertisers pay a fee for each advertisement or a predefined number of advertisements viewed by web users. Contracts to show advertisements are normally signed several weeks or months before advertisements get delivered and are often expressed in terms of page views. The duration of contracts typically ranges from one day to multiple years.

A significant portion of advertising contracts is in the form of guaranteed delivery bookings. A guaranteed booking specifies an agreement between the advertisement seller or portal and an advertiser. For example, a guaranteed booking specifies the price and the quantity of inventory, as well as the user target profile, to be delivered under the contract in advance of the advertisement being delivered or displayed.

In order to improve the efficiency of the marketplace, a pricing mechanism that reflects the true underlying value of the inventory delivered is needed. If a particular inventory is overpriced, the advertisers may become dissatisfied. Conversely, if a particular inventory is under-priced, revenue opportunities would be lost. Accordingly, it would be beneficial to provide appropriate pricing of such on-line advertising inventory.

SUMMARY OF THE INVENTION

Accordingly, apparatus and methods for pricing on-line advertisement inventory are disclosed. In one embodiment, a method for pricing on-line advertisement inventory includes (i) receiving a request for a price of a new product, wherein the new product includes a plurality of specified characteristics of a type of on-line advertisement display, (ii) providing a sample of new impressions that are predicted to be delivered for such new product, (iii) for each new impression, determining which bookings could be served by such new impression so as to define a set of overlapping bookings, (iv) determining the price of each new impression based on a weighted average of a plurality of prices of such each new impression's corresponding overlapping bookings, (v) determining the price of the new product based on an average of the prices of the new impressions, and (vi) returning the price of the new product for use in a booking negotiation with a potential buyer of such new product.

In a specific implementation, the specified characteristics of the new product include one or more specified web properties, one or more specified positions in such one or more web properties, and one or more specified targeting parameters. In yet another embodiment, the one or more specified targeting of each new product include one or more of the following: a geographical location or area, an age range, a gender, an income range, an educational level, one or more interest categories, and/or one or more behavior characteristics. In other aspects, the specified characteristics of the new product include a specified sub-property.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of embodiments of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that they are not intended to limit the invention to these specific embodiments. On the contrary, such description is intended to cover alternatives, modifications, and equivalents as may be included within the spirit and scope of the invention as defined by the appended claims. In the following description, numerous specific details are set forth in order to provide a thorough understanding of embodiments of the present invention. Embodiments of the present invention may be practiced without some or all of these specific details. In other instances, well known process operations have not been described in detail in order not to unnecessarily obscure embodiments of the present invention.

Overview

In general, mechanisms for valuing inventory at a highly granular level are provided herein. Advertisement sellers and advertisers typically specify the product of transaction in terms of web property, position, one or more event specifications, and one or more specified user targeting parameters. The individual advertisement displays that are delivered to meet an advertiser's specified product may be referred to as impressions. A web property may pertain to one or more web sites or a related set of web sites (e.g., a Finance web property). Sub-properties (e.g., a mutual fund web page from a Finance web property having multiple web pages) may also be specified. A property position may correspond to any suitable location with respect to displaying an advertisement in a particular property or sub-property. Examples of positions may correspond to particular relative positions on a web page (e.g., top, bottom, or side). An event specification may pertain to when the corresponding advertisement is displayed relative to a specified time (e.g., time of day or within a specified time-of-day window for displaying the advertisement) or one or more particular events (e.g., after occurrence of a user activity, such as performing a search in a Search property or sending an email).

A user targeting parameter may include any user characteristic that an advertisement may wish to target for advertisement purposes. User targeting parameters may include a geographical location or area, an age range, a gender, an income range, an educational level, one or more interest categories, one or more behavior characteristics, etc. Behavior characteristics may relate to tracked user activity (e.g., via user cookies), such as users that have visited specified sites, users that have visited specified sites more than a specified frequency, etc.

In certain embodiments, the price of each unique new product is determined as a weighted average of prices of other bookings that impressions for such new product can satisfy. The weight for each booking price can depend on a number of factors. In one implementation, the weight is proportional to the volume demanded by the booking. That is, if an advertiser books a very small number of impressions at a very high price, a high price for such booking is caused to have a relatively small influence on the price that is determined for a particular impression expected for the new product. The weight can also be inversely proportional to the number of eligible impressions to the booking. In this example, if a large number of impressions are eligible to serve a particular booking, then the advertiser for such particular booking does not need a particular impression as much as other bookings and, accordingly, is determined to have less influence on the price that is determined for the particular impression.

Although certain embodiments are described herein in relation to particular targeting parameters or product characteristics (such as specified web properties and user demographics), any suitable advertisement scheme may be utilized by an advertiser for displaying a particular advertisement in any suitable manner to any suitable type of person in any suitable context.

Figure 1:
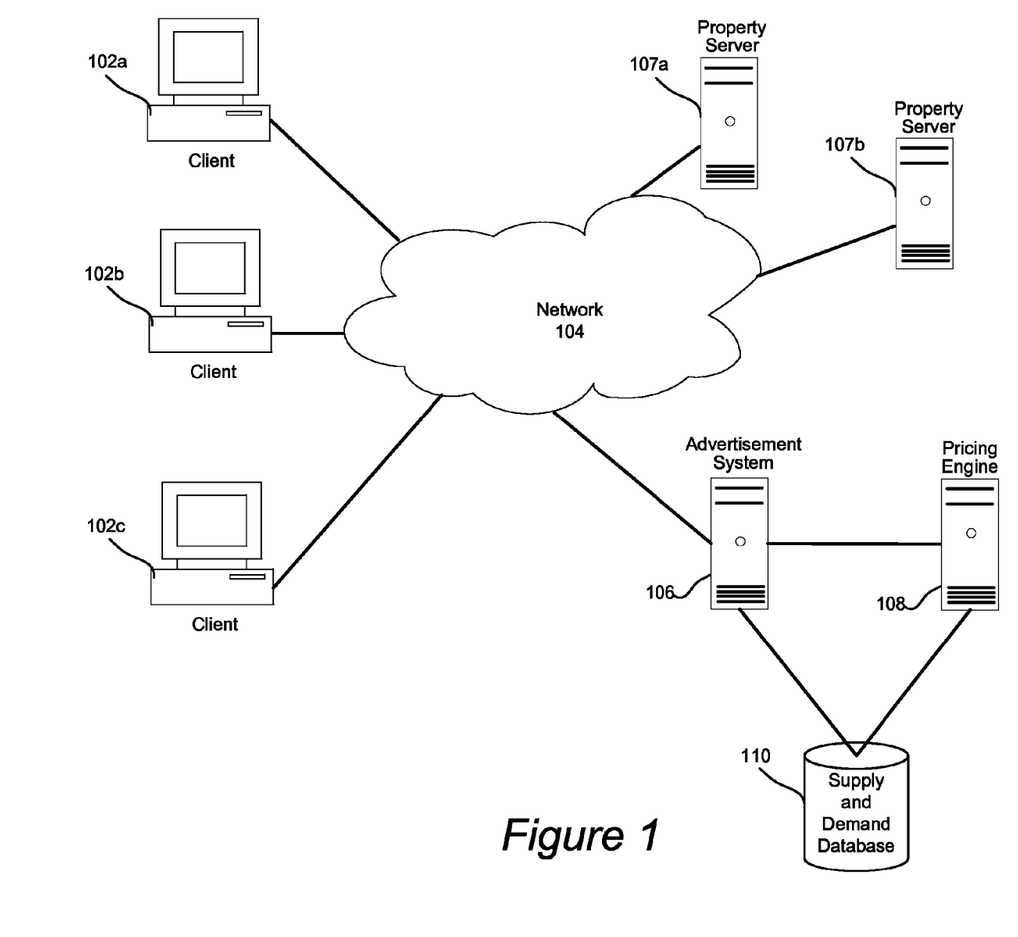
FIG. 1 illustrates an example network segment in which the present invention may be implemented in accordance with one embodiment of the present invention.

Prior to describing mechanisms for determining the price of a new product, a computer network architecture will first be briefly described to provide an example context for practicing techniques of the present invention. FIG. 1 illustrates an example network segment 100 in which the present invention may be implemented in accordance with one embodiment of the present invention. As shown, a plurality of clients 102 may access one or more web property applications, for example, on property servers 107a and 107b via network 104 and/or access an advertisement service, for example, on advertisement system server 106. The advertisement system may operate in conjunction with a pricing engine 108 that is operable to determine the price of a specified product. The advertisement system 106 and pricing engine 108 (or servers) may have access to one or more supply and demand database(s) 110 into which supply and demand information is retained.

The network may take any suitable form, such as a wide area network or Internet and/or one or more local area networks (LAN's). The network 104 may include any suitable number and type of devices, e.g., routers and switches, for forwarding web property requests from each client to each web property server and forwarding web property results back to the requesting clients or for forwarding data between various servers.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Each web property application may implement any type of web service that is provided by a particular service provider (e.g., Yahoo! Inc. of Sunnyvale, Calif.), such as Yahoo! Answers, Yahoo! Autos, Yahoo! Finance, Yahoo! Games, Yahoo! Groups, Yahoo! HotJobs, Yahoo! Maps, Yahoo! Movies/TV, Yahoo! Music, Yahoo! Personals, Yahoo! Real Estate, Yahoo Shopping, Yahoo! Sports, Yahoo! Travel, Yahoo! Yellow Pages, Yahoo! Local, Yahoo! Search, Yahoo! Email, etc. Each property application may be utilized by a user (human or automated), e.g., on clients 102a~102c. Additionally, each web property may correspond to any suitable number and type of web pages.

Advertisement salespeople who sell guaranteed contracts to advertisers may interact with advertisement system 106 (e.g., via client 102 and through network 104). In one embodiment, a salesperson may issue a query to advertisement system 106 regarding a specified product or target. For example, the product may be specified for a particular web property, e.g., the Yahoo! email web property, a specified position for the advertisement to be displayed in such property, and particular demographics, e.g., California males who like sports and autos. The advertisement system 106 may then obtain a price for such specified product (e.g., from pricing engine 108), obtain inventory availability information (e.g., from supply and demand database 110), and return the available inventory information and price to the querying salesperson (e.g., to client 102 via network 104). The salesperson may then book a contract accordingly (e.g., with advertisement system 106 via network 104). The advertisement system 106 then operates to fill the booking by providing the number of requested impressions (e.g., via a property server) at the negotiated price during the contract period.

Embodiments of the present invention may be employed with respect to any provider of one or more web property applications and advertisement system, and example providers include Yahoo! Inc., Google Inc., Microsoft Corp., etc. A plurality of web property applications, an advertisement system, and a pricing engine may be implemented on any number of servers although only one advertisement system 106, pricing engine 108, and two web property servers 107a and 107b are illustrated for clarity and simplification of the description.

Product Pricing Embodiments

Figure 2:
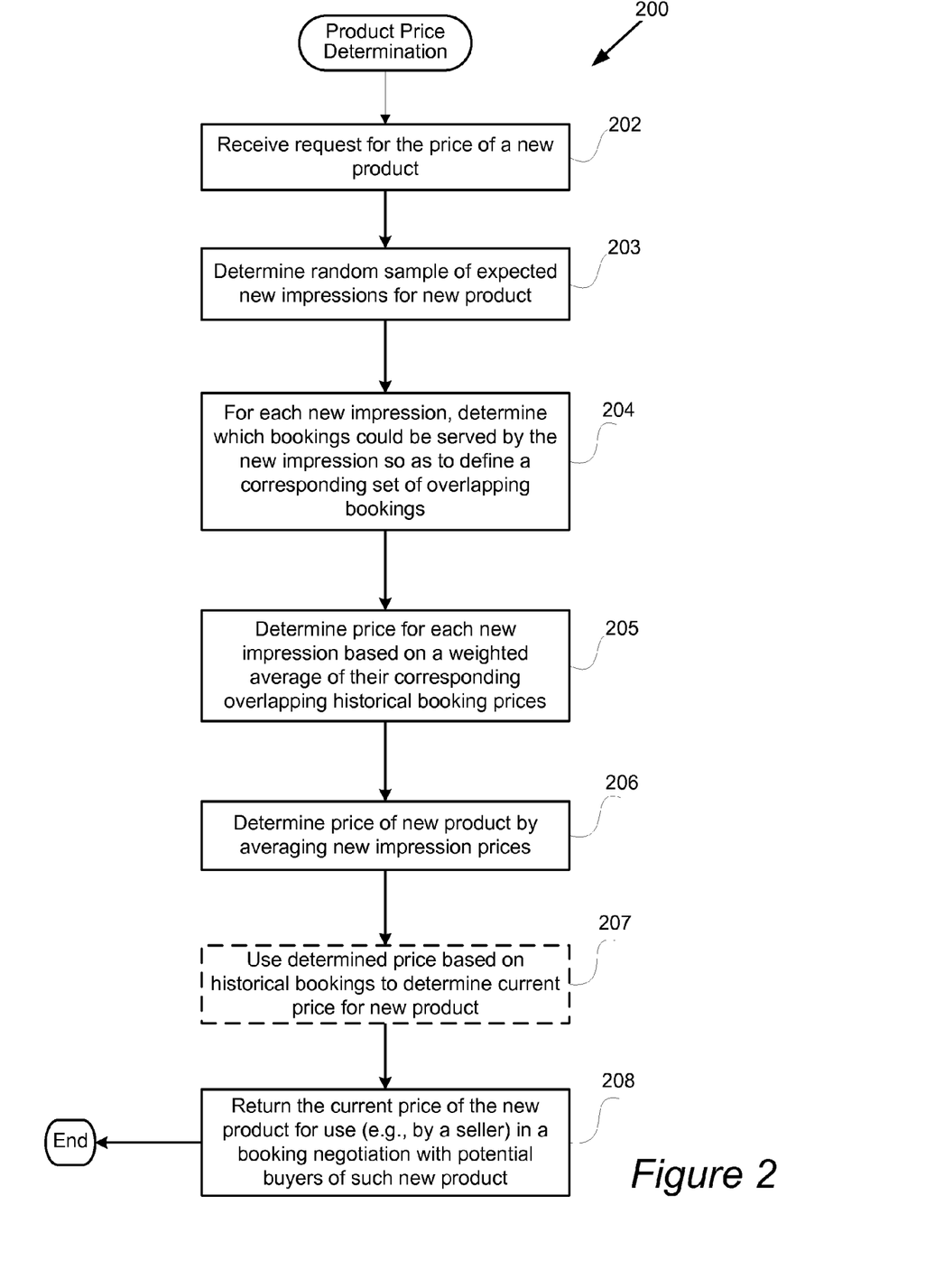
FIG. 2 is a flow chart illustrating a procedure for determining the price of a new product in accordance with one embodiment of the present invention.

Regardless of the specific architecture, any suitable mechanism for determining the price of a specified product based on a weighted average of eligible bookings may be provided. FIG. 2 is a flow chart illustrating a procedure 200 for determining the price of a new product in accordance with one embodiment of the present invention. Initially, a request for the price of a new product is received in operation 202. For instance, a salesperson sends a request for a new product that is directed towards a particular target or set of specified characteristics for a type of on-line advertisement display, such as advertising to all users of the Yahoo! Finance property who are male Californians. The request may also specify a time duration and number of impressions to be guaranteed for such time duration.

A sample of expected or predicted new impressions for the new product may then be provided or determined in operation 203. For instance, a random sample of impressions may be predicted for delivery during the specified time duration so as to meet the specified product characteristics. Inventory forecasting techniques are further described herein.

For each new impression, it may then be determined which bookings could be served by such each new impression so as to define a corresponding set of overlapping bookings in operation 204. Since all bookings may not have been made for the specified time duration of the new product, the sample may be time shifted relative to the new product. For example, if the new product has a specified time duration that ends in December 2008 and the current date is Sep. 25, 2008, the overlapping bookings may be obtained for a time duration that ends in June 2008 or any other suitable time that is earlier than the product's specified ending date so no more new bookings are possible for such ending date.

In general, it may be determined which bookings and their corresponding specified on-line advertisement display characteristics could be satisfied by each new impression (and its specified characteristics) that are expected to be delivered for the new product. Said in another way, it is determined which bookings have specified characteristics that are a subset of each new impression's specified characteristics. For a new impression for all Yahoo! Finance property users who are male Californians, the overlapping bookings may include a first booking for Yahoo! Network users (e.g., all Yahoo! property users) who are male Californians and a second booking for Yahoo! Finance users of who are male. In the present example, the new impression for Yahoo! Finance property users who are male Californians could be used to serve the first and second booking's specified impression characteristics.

Once a set of overlapping bookings are found for each new impression, the price of each new impression may be determined based on a weighted average of the corresponding overlapping historical booking prices in operation 205. That is, the price of each new impression may be determined based on weighted prices for bookings that overlap or are considered eligible for such new impression to satisfy. The weight values for each eligible booking may be determined based on any suitable factors, such as the number of impressions booked for the particular contract (N), the number of impressions that are eligible to the particular contract (H), etc.

Figure 3:
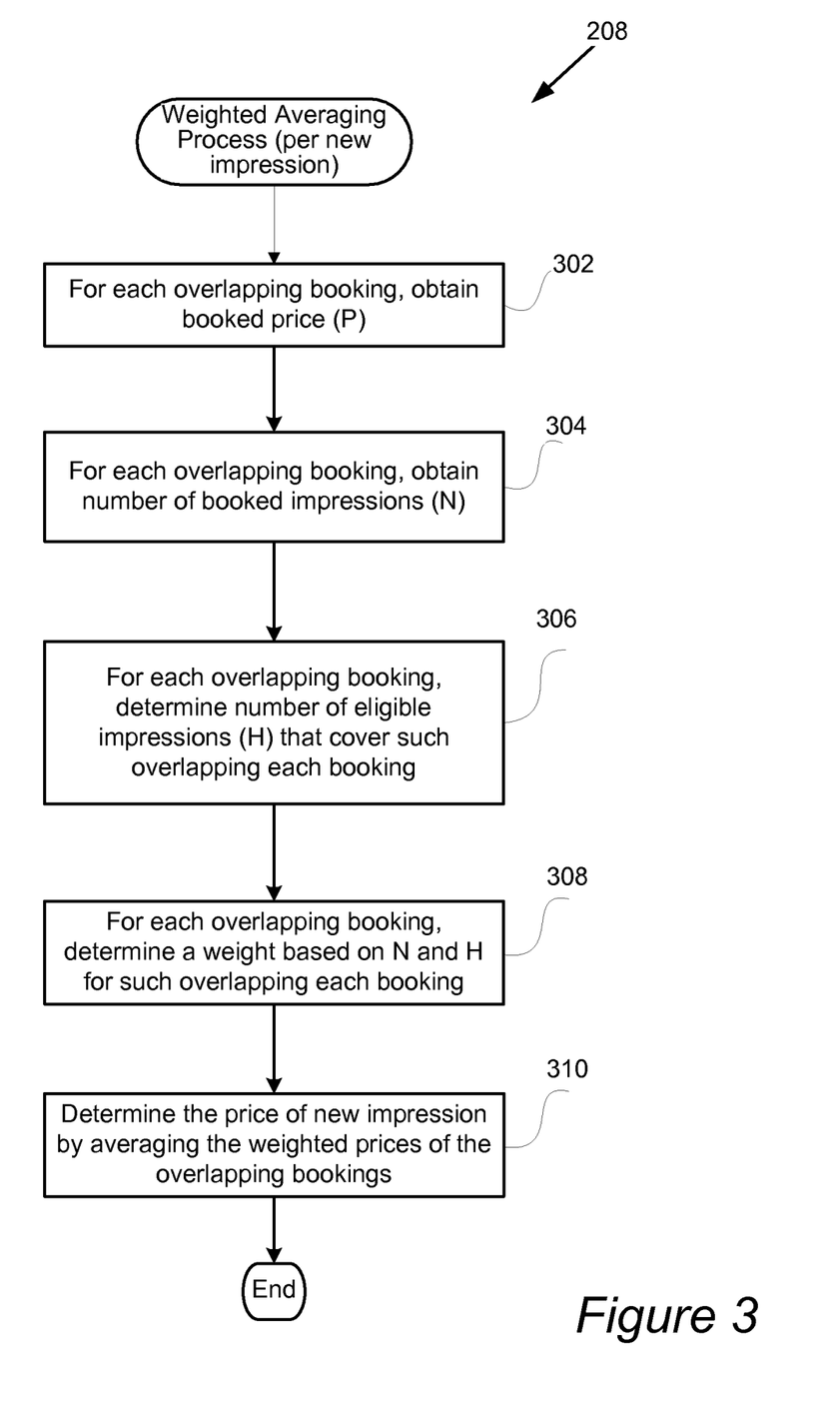
FIG. 3 is a flow chart illustrating the weighted averaging process of FIG. 2 in accordance with one embodiment of the present invention.

FIG. 3 is a flow chart illustrating the weighted averaging process 205 of FIG. 2 in accordance with a specific implementation of the present invention. The illustrated process 300 of FIG. 3 is implemented with respect to a single impression, and such process 300 may be repeated for each new impression that has been predicted for a new product. Alternatively, the operations of FIG. 3 could each be implemented once with respect to all new impressions. For each overlapping booking, a booked price (P) may be obtained in operation 302. For instance, as salespersons book contracts for particular products, impression number, prices, and durations, each salesperson may communicate booking information to the advertisement system 106 and such information is then retained in one or more database(s), such as supply and demand database 110. When a new request is received for a new product and its predicted impressions, the retained booking information may then be searched for overlapping bookings and their corresponding prices. In the above first and second booking example, the price of the first booking is $1 CPM (cost per million impressions) and the price of the second booking is $2 CPM. Other types of pricing formats for the overlapping bookings may also be utilized (e.g., cost per 1000 impressions, cost per click or CPC, cost per acquisition or CPA, etc.), of course, as long as consistent units are used to determine the new impression prices.

For each overlapping booking, the number of booked impressions (N) may be obtained (e.g., from supply and demand database 110) in operation 304. For instance, the first booking may be for 10,000 impressions while the second booking may be for 20,000 impressions. For each overlapping booking, the number of eligible impressions (H) may also be determined that covers such overlapping each booking during the sample period in operation 306. For instance, 100,000 impressions may be forecast to cover the first booking during its booking period while 200,000 impressions may be forecast to cover the second booking during its booking period.

The number of eligible impressions (H) for each booking may be determined using any suitable inventory forecasting technique for specific impressions. Several techniques for predicting inventory are described further below.

For each overlapping booking, a weight is determined based on N and H for such overlapping each booking in operation 308. For one embodiment, the weight for each is determined to be N/H for such booking. That is, the weight is directly proportional to the volume demanded by the contract. For example, if the advertiser books a very small number of impressions at a very high price, such high price has a lower influence on the price determined for the new impression. Conversely, the weight of an overlapping booking is inversely proportional to the number of eligible impressions to the contract. For example, if a large number of forecast impressions are eligible to serve a particular contract, then such booking price does not need a particular impression as much as other contracts and, accordingly, such particular contract price has a lower influence on the new impression price. In the above example, the weight for the first booking is 0.1 or 10,000/100,000 and the weight for the second booking is also 0.1 or 20,000/200,000.

A price for each new impression may then be determined by averaging the weighted prices of the corresponding overlapping historical bookings in operation 310. In one embodiment, a price, v, for the new impression, k, is determined by the following expression:

$$v(k) = \frac{\sum_{s \in B(k)} P(s) \frac{N(s)}{H(s)}}{\sum_{s \in B(k)} \frac{N(s)}{H(s)}}$$

where P is the price of an eligible booking s, N is the number of impressions for the eligible booking, and H is the number of impressions that can serve such eligible booking. The summations are applied to the set of eligible bookings $B(k)$: $\{s_1, \ldots, s_n\}$ for the new impression. For the above two booking example, the new impression price equals $1.50 CPM or ($1 CPM×0.1+$2 CPM×0.1)/(0.1+0.1).

It is possible to incorporate other factors, besides eligible booking information, into the above price expression for each new impression. In a further implementation, the average price of each new impression may be determined and incorporated into the above valuation model. For instance, users that generate a lot of the new impressions may be presumed to have a lower value (to the advertiser) since the effectiveness of advertisement diminishes with frequency. Thus, the above equation can be modified to multiply each new impression price by a factor that decreases with the average number of new impressions that a user generates each day or any suitable time period.

The above expression may be said to be biased in a way so that the lowest priced impression will be valued higher than the price of the cheapest booked impression. However, all impressions delivered by the cheapest contract are ideally at least as good as the least valuable impression. Accordingly, the method may sometimes overvalue low value impression and undervalue high value impressions. In alternative implementations, this bias may be corrected in some cases by assigning each new impression a percentile based on price so that the price generated by the above expression can be adjusted by multiplying an adjustment factor that is less than one for a new impression that is priced to be in the bottom percentile (of the impression prices) and more than one for a new impression that is priced to be in the top percentile (of the impression prices).

Referring back to FIG. 2, after the new impression prices are determined, the price of the new product may be determined based on an average of such new impression prices in operation 206. The determined product price can be said to be based on historical data and may be optionally adjusted for the current day or used "as is." Accordingly, the price that is determined for the new product may be used to then determine a current price for the new product in operation 207. For example, it may be determined that the current day has historically had lower or higher prices and the determined price may be adjusted accordingly to generate a current price that is more accurate for the current day.

This current price may then be returned for use (e.g., by the requesting salesperson) in a booking negotiation with a potential buyers of such new product in operation 208. For example, the salesperson who requested the price may use such price as a minimum price that will be accepted in the contract negotiation. Alternatively, the salesperson who requested the price may offer such returned price to a user with whom she is negotiating a booking or retain such price information for later use with other potential buyers of the same new product.

Additionally, since impressions that are forecast for particular bookings may be reallocated, a product's price may also be re-determined each time impressions are reallocated. Additionally, sales personal may be notified of new product prices so that they can negotiate bookings based on such new prices.

Inventory Forecasting

For predictions to be made in general, historical data is retained and used to extrapolate what will likely happen based on what happened in the past. According to one embodiment, historical data may be collected as users perform certain activities with respect to certain web properties. For instance, user data may be collected using cookies for a user who is logged into a service provider so that user targeting particulars can be collected along with information regarding the particular user activities. In another example, a user may download a web browser plug-in that tracks and logs web requests and responses that are sent between the user and particular web property applications. Data may also be compiled into weblogs that are records of traffic to each space compiled each day and provided by the various web servers in the network, e.g., web property servers 107a and 107b of FIG. 1. Historical data may include page view and run view (views that are made from a particular page view) histories for each major space.

An impression inventory forecaster may be provided that receives queries from an application to obtain an inventory forecast of advertisement impressions for targeting certain user profiles and returns the inventory forecast of the advertisement impressions for targeting user profiles. As used herein, a targeting user profile means one or more attributes associated with one or more users including demographics, online behavior, web page properties, and so forth. A searchable index of advertisement impressions, which are available on certain display advertising properties, may be built for a targeting profile of users from forecasted impression pools. A forecasted impression inventory indexer may generate an index of several index tables from forecasted impression pools to access trend data of forecasted impression inventory by attributes. The index may be searched to match forecasted impression pools for a targeting profile of users submitted in a query for a time period. An inventory forecast of advertisement impressions available on display advertising properties during the time period may be returned as query results for the targeting profile of attributes of users.

In one forecasting technique, historical impressions of advertisements served to online users may initially be retrieved from impression logs. In one embodiment, the impression logs may include recorded information of advertisement impressions that have been served. Impression pools with unique attributes may be created from impression logs. In one embodiment, an impression pool represents a collection of advertisement impressions that share the same attributes, such as web page attributes including properties of the web page and the web page position of an advertisement, visitor attributes such as age, gender, geographical area of residence (e.g., state or country), behavioral interests, behavior activities, time attributes such as date and hour of the day, and other attributes such as attributes of a browser. An impression pool may also include a count of the total number of impressions in the impression pool.

Samples of historical impressions may be extracted from the impression logs. To save storage and computation time, a subset of the impression logs may be processed and kept in an embodiment that may be used to generate a forecast of inventory of advertisement impressions for targeting user profiles. For example, samples representing 4% of historical impressions may be used. The extracted samples of historical impressions may be assigned to impression pools. An impression pool may be defined by attributes such as time attributes, user demographics attributes, behavior attributes, web page attributes and so forth. A sample advertisement impression may be assigned to one or more impression pools that share the unique attributes of the sample impression. For example, a web page may belong to multiple properties or sub-properties and each of the properties or sub-properties may be listed as its web page attribute.

Trend forecast data may be retrieved for untargeted inventory forecasting of advertisement impressions. Impression pools of sample impressions may be matched to trend forecast for display advertising properties to generate forecasted impression pools. In one embodiment, the attributes from an impression pool may be used to match a web page property or collection of related web pages in an inventory trend forecast table with columns including a web page property or collection of related web pages, web page position of an advertisement, and the ratio of the number of forecasted impressions on a given date to the number of actual impressions on a reference date in the past. Each forecasted impression pool may include the information from an impression pool and a pointer to a row in the inventory trend table for a matching display advertising property.

An index of index tables may be built for the forecasted impression pools. In a specific application, there may be millions of forecasted impression pools, each of which may contain dozens or even hundreds of attributes. An efficient indexing technology known in the art, such as FastBit, may be used in one implementation to scan the forecasted impression pools and build an index table for each attribute value. The index of index tables may then be stored for the forecasted impression pools.

Once the index tables are built, the data can be queried very efficiently. A query specifying a targeting profile of attributes of users and a time period may be received. For instance, a query may specify the following attributes of a targeting profile: "property=Finance", "age>30", and "country=US". The time period may be specified as a data range such as "7/1/2009 to 12/31/2009". The index may be searched to find forecasted impression pools that match the targeting profile of attributes of users.

An inventory forecast may be determined by summing trend forecast data during the time period specified in the query for each matching forecasted impression pool. In one embodiment, for each date in the time period specified in the query, the trend forecast data may be computed for each matching impression pool and then it may be added to the total inventory forecast. The inventory forecast of advertisement impressions available on display advertisement properties available during the time period may be output for targeting the profile of attributes of users.

The forecast of an inventory of online advertisement impressions may be generated to target many different user profiles. For instance, web page attributes such as properties of the page and the web page position of an advertisement may be used. User attributes for online behavior and/or demographics including age, gender, and country, may be used for targeting user profiles. Or user profiles may be targeted by time, browser attribute or type, and so forth. Certain embodiments may provide accurate forecasting for any combination of thousands of targeting attributes. Thus, certain embodiments may provide a publisher with the capability to forecast available inventories of advertisement impressions for targeting different combinations of attributes before selling them to online advertisers who would like to target users visiting certain web pages with certain demographics, geographies, behavioral interests, as well as many other attributes.

Other forecasting techniques may be used herein and modified to forecast individual impressions for a particular impression request, such as the forecasting techniques that are further described in U.S. application, having Publication No. 2005/0050215 A1, published 3 Mar. 2005, by Long-Ji Lin et al., entitled "Systems and Methods for Predicting Traffic on Internet Sites", which patent application is incorporated herein by reference in its entirety for all purposes.

Computer System

Figure 4:
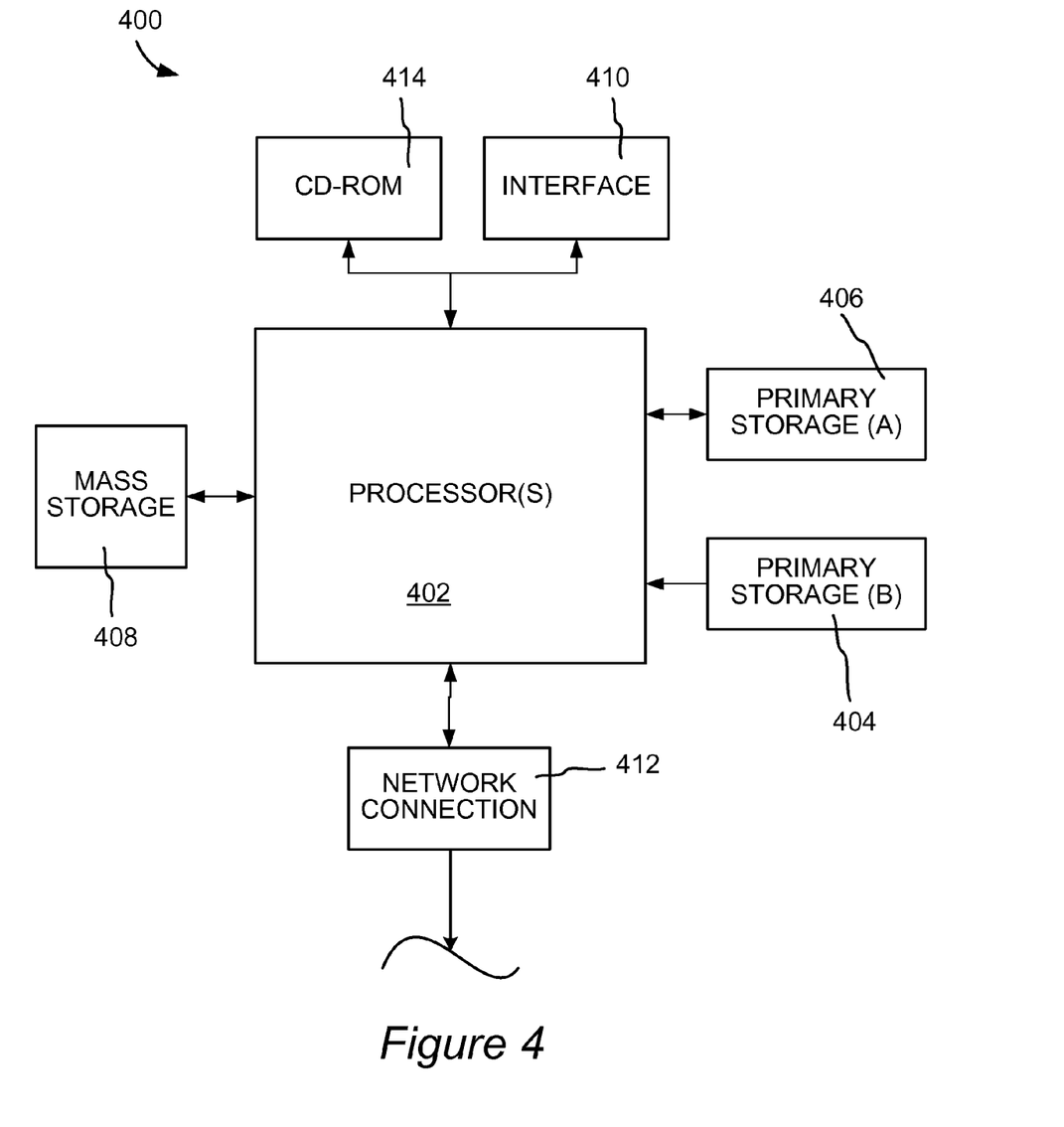
FIG. 4 illustrates an example computer system in which specific embodiments of the present invention may be implemented.

FIG. 4 illustrates a typical computer system that, when appropriately configured or designed, can serve as an advertisement pricing system. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers and microprocessors such as programmable devices (e.g., CPLDs and FPGAs) and unprogrammable devices such as gate array ASICs or general-purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described herein. A mass storage device 408 is also coupled bi-directionally to CPU 402 and provides additional data storage capacity and may include any of the computer-readable media described herein. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 is also coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications network using an external connection as shown generally at 412. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store new impression target information, booking prices, booking duration, number of impressions for each booking, forecast impressions that cover each booking, supply and demand information, weights, new impression prices, average prices of impressions on the non-guaranteed market, degree of user scarcity, price based percentiles and factors, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for pricing on-line advertisement inventory, comprising:
   at an advertisement server, receiving a request for a price of a new product, wherein the new product includes a plurality of specified characteristics of a type of on-line advertisement display, wherein the plurality of specified characteristics of the new product include one or more specified targeting parameters of the new product, at least a portion of the specified targeting parameters indicating characteristics of users that are to receive impressions that are to be delivered for the new product;

at the advertisement server, predicting a sample of new impressions that are to be delivered for such new product based, at least in part, upon the specified targeting parameters of the new product;

for each predicted new impression, determining at the advertisement server which bookings, specifying a booked product with specified on-line advertisement characteristics, could be served by such new impression so as to define a set of overlapping bookings;

determining the price of each new impression, wherein determining the price of each new impression is based, at least in part, on a booked price for each overlapping booking for the new impression, a number of booked impressions for each overlapping booking, and a number of eligible impressions that can be served for each overlapping booking;

determining the price of the new product based on an average of the prices of the new impressions; and returning from the advertisement server the price of the new product for use in a booking negotiation with a potential buyer of such new impression.

2. The method as recited in claim 1, wherein the plurality of specified characteristics of the new product further comprise one or more specified web properties and one or more specified positions in such one or more web properties.

3. The method as recited in claim 1, wherein determining the price of each new impression comprises:

for each corresponding overlapping booking, obtaining a booked price (P);

for each corresponding overlapping booking, obtaining a number of booked impressions (N) for such each overlapping booking;

for each corresponding overlapping booking, determining a number of eligible impressions (H) that can be served for such each overlapping booking;

for each corresponding overlapping booking, determining a corresponding weight based on the N and H for such each overlapping booking; and determining the price of the each new impression based on the following equation:

$$v(k) = \frac{\sum_{s \in B(k)} P(s) \frac{N(s)}{H(s)}}{\sum_{s \in B(k)} \frac{N(s)}{H(s)}},$$

wherein the summations are applied over the set of corresponding overlapping bookings, B(k).

4. The method as recited in claim 3, wherein the price determined for each new impression is multiplied by a factor that decreases with an increase in an average number of new impressions that users generate for a particular time period.

5. The method as recited in claim 3, wherein the price determined for each new impression is multiplied by a factor that is less than one when the new impression's determined price is in a bottom percentile of the impression prices and that is more than one when the new impression's determined prices is in a top percentile of the impression prices.

6. The method as recited in claim 1, wherein the one or more specified targeting parameters of the new product comprise one or more of the following: a geographical location or area, an age range, a gender, an income range, an educational level, one or more interest categories, and/or one or more behavior characteristics.

7. The method as recited in claim 1, wherein the specified characteristics of the new product further comprise a specified sub-property.

8. An apparatus comprising at least a processor and a memory, wherein the processor and/or memory are configured to perform the following operations:

receiving a request for a price of a new product, wherein the new product includes a plurality of specified characteristics of a type of on-line advertisement display;

predicting a sample of new impressions that are to be delivered for such new product;

for each predicted new impression, determining which bookings, specifying a booked product with specified on-line advertisement characteristics, could be served by such new impression so as to define a set of overlapping bookings;

determining the price of each new impression, wherein determining the price of each new impression is based, at least in part, on a booked price for each overlapping booking for the new impression, a number of booked impressions for each overlapping booking, and a number of eligible impressions that can be served for each overlapping booking;

determining the price of the new product based on an average of the prices of the new impressions; and returning the price of the new product for use in a booking negotiation with a potential buyer of such new impression.

9. The apparatus as recited in claim 8, wherein the specified characteristics of the new product comprise one or more specified web properties, one or more specified position in such one or more web properties, and one or more specified targeting parameters.

10. The apparatus as recited in claim 8, wherein determining the price of each new impression comprises:

for each corresponding overlapping booking, obtaining a booked price (P);

for each corresponding overlapping booking, obtaining a number of booked impressions (N) for such each overlapping booking;

for each corresponding overlapping booking, determining a number of eligible impressions (H) that can be served for such each overlapping booking;

for each corresponding overlapping booking, determining a corresponding weight based on the N and H for such each overlapping booking; and determining the price of each new impression based on the following equation:

$$v(k) = \frac{\sum_{s \in B(k)} P(s) \frac{N(s)}{H(s)}}{\sum_{s \in B(k)} \frac{N(s)}{H(s)}},$$

wherein the summations are applied over the set of corresponding overlapping bookings, B(k).

11. The apparatus as recited in claim 10, wherein the price determined for each new impression is multiplied by a factor that decreases with an increase in an average number of new impressions that users generate for a particular time period.

12. The apparatus as recited in claim 10, wherein the price determined for each new impression is multiplied by a factor that is less than one when the new impression's determined price is in a bottom percentile of impression prices and that is more than one when the new impression's determined prices is in a top percentile of impression prices.

13. The apparatus as recited in claim 9, wherein the one or more specified targeting parameters of the new product comprise one or more of the following: a geographical location or area, an age range, a gender, an income range, an educational level, one or more interest categories, and/or one or more behavior characteristics.

14. The apparatus as recited in claim 8, wherein the specified characteristics of the new product comprise a specified sub-property.

15. At least one non-transitory computer readable storage medium having computer program instructions stored thereon that are arranged to perform the following operations:
receiving a request for a price of a new product, wherein the new product includes a plurality of specified characteristics of a type of on-line advertisement display;
predicting a sample of new impressions that are to be delivered for such new product;
for each predicted new impression, determining which bookings, specifying a booked product with specified on-line advertisement characteristics, could be served by such new impression so as to define a set of overlapping bookings;
determining the price of each new impression, wherein determining the price of each new impression is based, at least in part, on a booked price for each overlapping booking for the new impression, a number of booked impressions for each overlapping booking, and a number of eligible impressions that can be served for each overlapping booking;
determining the price of the new product based on an average of the prices of the new impressions; and
returning the price of the new product for use in a booking negotiation with a potential buyer of such new impression.

16. The at least one non-transitory computer readable storage medium as recited in claim 15, wherein the specified characteristics of the new product comprise one or more specified web properties, one or more specified positions in such one or more web properties, and one or more specified targeting parameters of the new product.

17. The at least one non-transitory computer readable storage medium as recited in claim 15, wherein determining the price of each new impression comprises:
for each corresponding overlapping booking, obtaining a booked price (P);
for each corresponding overlapping booking, obtaining a number of booked impressions (N) for such each overlapping booking;
for each corresponding overlapping booking, determining a number of eligible impressions (H) that can be served for such each overlapping booking;
for each corresponding overlapping booking, determining a corresponding weight based on the N and H for such each overlapping booking; and
determining the price of each new impression based on the following equation:

$$v(k) = \frac{\sum_{s \in B(k)} P(s) \frac{N(s)}{H(s)}}{\sum_{s \in B(k)} \frac{N(s)}{H(s)}},$$

wherein the summations are applied over the set of corresponding overlapping bookings, B(k).

18. The at least one non-transitory computer readable storage medium as recited in claim 17, wherein the price determined for each new impression is multiplied by a factor that decreases with an increase in an average number of new impressions that users generate for a particular time period.

19. The at least one non-transitory computer readable storage medium as recited in claim 17, wherein the price determined for each new impression is multiplied by a factor that is less than one when the new impression's determined price is in a bottom percentile of impression prices and that is more than one when the new impression's determined prices is in a top percentile of impression prices.

20. The least at least one non-transitory computer readable storage medium as recited in claim 16, wherein the one or more specified targeting parameters of the new product comprise one or more of the following: a geographical location or area, an age range, a gender, an income range, an educational level, one or more interest categories, and/or one or more behavior characteristics.

21. The least at least one non-transitory computer readable storage medium as recited in claim 15, wherein the specified characteristics of the new product comprise a specified sub-property.

* * * * *